(12) United States Patent
Yanai

(10) Patent No.: US 9,134,542 B2
(45) Date of Patent: Sep. 15, 2015

(54) LIGHT SOURCE DEVICE AND PROJECTOR

(75) Inventor: Hiroaki Yanai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 448 days.

(21) Appl. No.: 13/114,522

(22) Filed: May 24, 2011

(65) Prior Publication Data

US 2011/0310349 A1    Dec. 22, 2011

(30) Foreign Application Priority Data

Jun. 17, 2010   (JP) ................. 2010-138001

(51) Int. Cl.
G03B 21/14 (2006.01)
G02B 27/28 (2006.01)
G03B 21/20 (2006.01)
H04N 9/31 (2006.01)
G02B 27/48 (2006.01)

(52) U.S. Cl.
CPC ............ G02B 27/285 (2013.01); G03B 21/204 (2013.01); G03B 21/2033 (2013.01); G03B 21/2073 (2013.01); H04N 9/3161 (2013.01); H04N 9/3167 (2013.01); G02B 27/48 (2013.01)

(58) Field of Classification Search
CPC ................. H01L 27/14; G03B 21/14

USPC ..................... 353/20; 362/231, 293; 359/487
See application file for complete search history.

(56) References Cited

U.S. PATENT DOCUMENTS

| | | | |
|---|---|---|---|
| 7,118,229 B2 | 10/2006 | Iechika et al. | |
| 8,354,790 B2 | 1/2013 | Iwanaga | |
| 2004/0159900 A1* | 8/2004 | Ouderkirk et al. | 257/431 |
| 2004/0196443 A1* | 10/2004 | Tomita et al. | 353/94 |
| 2006/0114423 A1* | 6/2006 | Maeda et al. | 353/94 |
| 2006/0139926 A1* | 6/2006 | Morioka et al. | 362/260 |
| 2009/0034284 A1* | 2/2009 | Li et al. | 362/554 |
| 2010/0053558 A1* | 3/2010 | Yanagisawa | 353/20 |

FOREIGN PATENT DOCUMENTS

| | | |
|---|---|---|
| CN | 1457446 A | 11/2003 |
| CN | 101581410 A | 11/2009 |
| JP | A-2003-302523 | 10/2003 |

* cited by examiner

*Primary Examiner* — William C Dowling
*Assistant Examiner* — Jerry Brooks
(74) *Attorney, Agent, or Firm* — Oliff PLC

(57) ABSTRACT

A light source device which can prevent deterioration of a polarization rotation element and an adhesive for bonding the polarization rotation element is to be provided. A light source device includes a polarization separation element obtaining first polarization and second polarization by separation and a polarization rotation element converting a polarization component aligned in a second polarization direction into a polarization component aligned in a first polarization direction.

9 Claims, 3 Drawing Sheets

LIGHT SOURCE DEVICE AND PROJECTOR

BACKGROUND

1. Technical Field

The present invention relates to light source devices and projectors and, in particular, to a technique for a light source device using a laser light.

2. Related Art

A projector displaying an image by using a light emitted from a light source device has become widespread. For example, there is a projector having transmissive liquid crystal display panels for a red (R) light, a green (G) light, and a blue (B) light and a light combining optical apparatus which combines the lights modulated by the transmissive liquid crystal display panels. In such a projector, if the polarization direction of the light emitted from the light source device is random, light loss in the transmissive liquid crystal display panels becomes large. Therefore, it is necessary to align the polarization directions in a predetermined direction by using a polarization conversion element.

The polarization conversion element includes a polarization separation element and a polarization rotation element, for example. The polarization conversion element separates the incident light into a polarization component aligned in a first polarization direction and a polarization component aligned in a second polarization direction perpendicular to the first polarization direction by means of the polarization separation element. Then, the polarization conversion element makes the polarization rotation element convert the polarization component aligned in the second polarization direction into a polarization component aligned in the first polarization direction, and thereby adjusts the polarization direction of the emitted light to coincide with the first polarization direction.

In such a polarization conversion element, as the polarization rotation element, organic material such as olefin or polycarbonate is sometimes used. However, when the organic material is used as the polarization rotation element, deterioration of the organic material and deterioration of an adhesive for bonding the polarization rotation element as a result of being illuminated with a light become a problem.

Therefore, for example, JP-A-2003-302523 discloses a technique using inorganic material such as quartz crystal as the polarization rotation element.

However, the polarization rotation element using the inorganic material is disadvantageous in that it is more expensive and has lower polarization conversion efficiency than the polarization rotation element using the organic material. Moreover, since the polarization rotation element using the inorganic material is also bonded by using an adhesive, it also suffers a reduction in reliability due to deterioration of the adhesive. In particular, a technique using a laser light source as a light source of the projector has been recently proposed, and deterioration of the polarization rotation element and the adhesive caused by a high-density light tends to become a problem.

SUMMARY

An advantage of some aspects of the invention is to provide a light source device which can prevent deterioration of a polarization rotation element and an adhesive for bonding the polarization rotation element, and to provide a projector using the light source device.

According to an aspect of the invention, there is provided a light source emitting a coherent light having a polarization component aligned in a first polarization direction, a scattering element scattering the coherent light, a polarization separation element separating a polarization component aligned in a second polarization direction which is nearly perpendicular to the first polarization direction from a scattered light which has passed through the scattering element, and a polarization rotation element provided on an optical path along which the polarization component aligned in the second polarization direction passes, the polarization component aligned in the second polarization direction being separated by the polarization separation element, the polarization rotation element converting the polarization component aligned in the second polarization direction into a polarization component aligned in the first polarization direction.

Part of the light scattered by the scattering element is converted into a polarization component aligned in the second polarization direction. By scattering caused by the scattering element, a portion of a light whose polarization component is changed to the second polarization direction is generally smaller than a portion of a light whose polarization component is kept in the first polarization direction. Since the polarization component aligned in the second polarization direction is made to enter the polarization rotation element, it is possible to reduce the amount of light which enters the polarization rotation element. As described above, by reducing the amount of light which enters the polarization rotation element, it is possible to prevent deterioration of the polarization rotation element and the adhesive which bonds the polarization rotation element.

Moreover, according to the aspect of the invention, it is preferable that the scattering element be a fluorescent layer. By using the fluorescent layer as the scattering element, it is possible to provide a light source device which uses a fluorescence generated by excitation of the fluorescent layer.

Furthermore, according to the aspect of the invention, it is preferable that the polarization rotation element be formed of organic material. As mentioned above, since it is possible to reduce the amount of light which enters the polarization rotation element, also in a case in which organic material such as olefin or polycarbonate is used as the polarization rotation element, it is possible to prevent deterioration of the organic material and contribute to an increase of the reliability of the light source device. Moreover, by using the organic material, it is possible to reduce the cost of the light source device and increase polarization conversion efficiency.

In addition, according to the aspect of the invention, it is preferable that the polarization rotation element be formed of inorganic material. As mentioned earlier, since it is possible to reduce the amount of light which enters the polarization rotation element, also in a case in which inorganic material such as quartz crystal or sapphire is used as the polarization rotation element, it is possible to prevent deterioration of an adhesive for bonding such inorganic material. That is, also in a case in which the inorganic material is used as the polarization rotation element, it is possible to contribute to an increase of the reliability of the light source device.

Moreover, according to another aspect of the invention, a projector includes the light source device described above and a spatial light modulator modulating a light according to an image signal, the light being emitted from the light source device. By using the light source device described above, it is possible to prevent deterioration of the polarization rotation element, and thereby increase the reliability of the projector and obtain a high-quality image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described in detail with reference to the drawings.

First Embodiment

Figure 1:
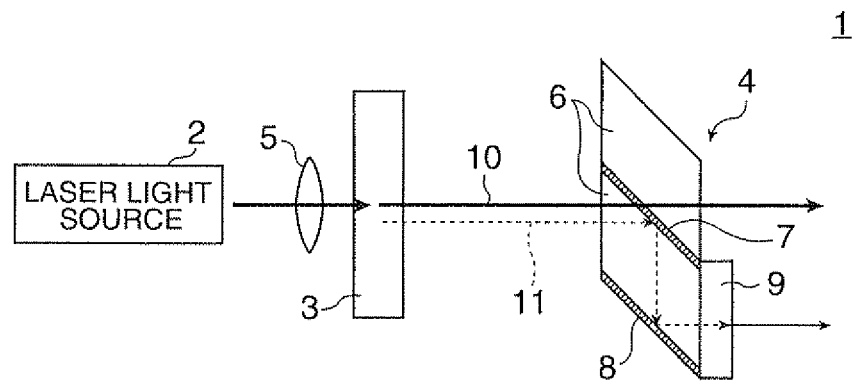
FIG. 1 is a diagram showing a schematic configuration of a light source device according to a first embodiment of the invention.

FIG. 1 is a diagram showing a schematic configuration of a light source device according to a first embodiment of the invention. A light source device 1 includes a laser light source 2, a scattering element 3, and a polarization conversion element 4. The laser light source 2 emits a laser light as a coherent light toward the scattering element 3. The laser light is a coherent light, and a direction of the polarization is aligned in a first direction. In other words, the laser light has a polarization component aligned in a first polarization direction.

The scattering element 3 scatters the laser light emitted from the laser light source 2. By making the scattering element 3 scatter the laser light which is a coherent light, it is possible to reduce coherence. This makes it possible to reduce speckle noise caused by the light emitted from the light source device 1. As the scattering element 3, a scattering element formed of a mixture of materials having different indexes of refraction is used. For example, the scattering element is formed by mixing fluorescent material having an index of refraction of 1.6 or more into an adhesion layer having an index of refraction of 1.4 to 1.5. The scattering element 3 into which fluorescent material is mixed is excited as a result of being irradiated with the laser light from the laser light source 2, and produces fluorescence. That is, by forming the scattering element 3 as a fluorescent layer containing fluorescent material, the light source device 1 can perform color reproduction in a range in which the light emitted from the laser light source 2 and the fluorescence are combined, and can be suitably used in a display device.

The laser light whose polarization component is aligned in the first polarization direction is scattered by the scattering element 3, whereby the polarization state thereof is disturbed. More specifically, a portion of a light whose polarization component is aligned in the first polarization direction is converted into a light whose polarization component is aligned in a second polarization direction perpendicular to the first polarization direction.

As a result of scattering by the scattering element 3, a portion of a light whose polarization component is changed to the second polarization direction is generally smaller than a portion of a light whose polarization component is kept unchanged in the first polarization direction. For example, the ratio of the polarization component aligned in the first polarization direction to the polarization component aligned in the second polarization direction before the laser light enters the scattering element 3 is 100:0, but the ratio of the polarization component aligned in the first polarization direction to the polarization component aligned in the second polarization direction is changed to 80:20 as a result of scattering by the scattering element 3. Incidentally, the light exiting from the scattering element 3 is collimated by a collimating system 5 and travels toward the polarization conversion element 4.

Incidentally, the rate of polarization kept unchanged by scattering was measured by an experiment. A sample of a scattering element was produced by applying a scattering layer formed by mixing phosphor and an adhesive in a 2:5 volume ratio and having a thickness of μm on the surface of quartz glass. Phosphor has an index of refraction of 1.8, and the resin adhesive has an index of refraction of 1.4. Measurement was performed by placing a light source, a polarizer, the sample, an analyzer, and a detector in this order and making the absorption axis of the polarizer (the polarizing plate) coincide with the absorption axis of the analyzer (the polarizing plate). As a result, the rate of polarization kept unchanged was found to be about 74%.

The polarization conversion element 4 has a base 6, a polarization separation element 7, a reflection mirror 8, and a polarization rotation element 9. The base 6 is a plate-like member formed by bonding prisms in the shape of a parallelogram in cross section, the parallelogram with one pair of opposite angles each measuring 45° and another pair of opposite angles each measuring about 135°, at their oblique faces.

At the interface at which the prisms are bonded, the polarization separation element 7 is formed by evaporation. The polarization separation element 7 is, for example, a PBS (polarizing beam splitter) film. Of the light which has entered the polarization separation element 7, the polarization separation element 7 reflects a polarization component aligned in a predetermined polarization direction and allows a polarization component aligned in a polarization direction perpendicular to the predetermined polarization direction to pass therethrough.

The reflection mirror 8 is formed by evaporation on a side which the light reflected from the polarization separation element 7 enters, that is, the side facing the side on which the polarization separation element 7 is formed by evaporation. The reflection mirror 8 reflects almost all the lights which have entered the reflection mirror 8, and makes the lights exit from the exiting-face side of the polarization conversion element 4.

The polarization rotation element 9 is provided in a position from which the light which has passed through the polarization separation element 7 exits, and is bonded to the base 6 by using an adhesive. The polarization rotation element 9 is a half-wavelength plate as a retardation film, for example. The polarization rotation element 9 converts the polarization direction of the light which has entered the polarization rotation element 9 into a predetermined polarization direction by rotating the polarization direction by 90 degrees, and makes the light exit. Therefore, the light which has entered the polarization conversion element 4 is made to have the polarization component aligned in the predetermined polarization direction and is made to exit therefrom.

Here, the polarization conversion element 4 is arranged so that the polarization direction (the first polarization direction) of the laser light emitted from the laser light source 2 becomes a predetermined direction. As a result, the polarization conversion element 4 makes the light exiting from the scattering element 3 have the polarization component aligned in the first polarization direction and exit therefrom.

That is, of the light exiting from the scattering element 3 and entering the polarization conversion element 4, the polarization component (the component indicated by an arrow 10) aligned in the first polarization direction passes through the polarization separation element 7 and is made to exit while the polarization component is kept in the first polarization direction.

Moreover, of the light exiting from the scattering element 3 and entering the polarization conversion element 4, the polarization component (the component indicated by an arrow 11) aligned in the second polarization direction is reflected from the polarization separation element 7 and is further reflected from the reflection mirror 8, Then, the polarization component aligned in the second polarization direction is converted into the polarization component aligned in the first polarization direction as a result of the polarization direction thereof being rotated by 90 degrees by the polarization rotation element 9, and is made to exit.

As described earlier, in the light exiting from the scattering element 3, a portion of a light whose polarization component is changed to the second polarization direction is smaller than a portion of a light whose polarization component is kept unchanged in the first polarization direction. In the first embodiment, since the polarization component aligned in the second polarization direction is made to enter the polarization rotation element 9, the amount of light which enters the polarization rotation element 9 is reduced. By reducing the amount of light which enters the polarization rotation element 9 as described above, it is possible to prevent deterioration of the polarization rotation element 9 and the adhesive which bonds the polarization rotation element 9 to the base 6.

Moreover, since it is possible to reduce the amount of light which enters the polarization rotation element 9, also in a case in which organic material such as olefin or polycarbonate is used as the polarization rotation element 9, it is possible to prevent deterioration of the organic material and thereby contribute to an increase of the reliability of the light source device 1. Furthermore, by using the organic materials, it is possible to reduce the cost of the light source device 1 and increase polarization conversion efficiency.

Moreover, also in a case in which inorganic material such as quartz crystal or sapphire is used as the polarization rotation element 9, it is possible to prevent deterioration of an adhesive for bonding such inorganic material. Furthermore, since a cost of a retardation film made of inorganic material is relatively high, it is often formed of a small number of layers. This results in a narrower wavelength range of polarization rotation and a reduction in efficiency. Therefore, reducing the amount of light which enters the polarization rotation element 9 and relatively increasing the amount of light which travels on the other optical path leads to an increase of the efficiency of the light source device 1. That is, also in a case in which the inorganic material is used as the polarization rotation element 9, the configuration of the first embodiment can contribute to an increase of the reliability and efficiency of the light source device 1.

Incidentally, the half-wavelength plate is used as the polarization rotation element 9; however, the polarization rotation element 9 is not limited to the half-wavelength plate, and other phase difference plates can be used. For example, a quarter-wavelength plate may be used. In this case, the quarter-wavelength plate is placed between the prism 6 and the reflection mirror 8 so as to make the polarization component aligned in the second polarization direction pass through the quarter-wavelength plate two times.

With this configuration, the phase of the polarization component aligned in the second polarization direction reflected from the polarization separation element 7 is delayed by ¼ wavelength as a result of the polarization component passing through the quarter-wavelength plate, and the polarization component becomes a right-handed (left-handed) circularly-polarized light. The phase of the right-handed (left-handed) circularly-polarized light is then delayed by ½ wavelength as a result of reflection from the reflection mirror 8, and the right-handed (left-handed) circularly-polarized light becomes a left-handed (right-handed) circularly-polarized light. Then, the phase of the right-handed (left-handed) circularly-polarized light is advanced by ¼ wavelength as a result of the polarization component passing through the ¼ wave plate again from the opposite direction, whereby the polarization component aligned in the second polarization direction is converted into a linear polarization rotated by 90 degrees from the second polarization direction, that is, the polarization component aligned in the first polarization direction.

Moreover, between the scattering element 3 and the polarization conversion element 4, a lens array or a rod integrator may be provided to homogenize illumination.

Furthermore, in addition to the laser light source 2, the light source device 1 may include another light source. In this case, both the light emitted from the laser light source 2 and a light emitted from the other light source are made to enter the polarization conversion element 4. Specifically, the laser light source 2 and the other light source are placed side by side, or the lights from these light sources are combined by a light combining element placed in front of the polarization conversion element 4.

As the other light source, a fluorescent light source which excites fluorescent material, an LED, a mercury lamp, and a halogen lamp can be used. As a result, it is possible to increase the amount of light of the light source device 1 and extend the color reproduction range thereof. The polarization conversion element 4 converts the polarization component aligned in the second polarization direction, the polarization component generated as a result of the light from the laser light source 2 passing through the scattering element 3, into the polarization component aligned in the first polarization direction, thereby improving the efficiency of the light source device 1. Furthermore, in the configuration in which the other light source is provided, the polarization conversion element 4 makes the polarization direction of the other light source aligne in the first polarization direction, and thereby greatly improves the efficiency of the light source device 1.

The scattering element 3 is not limited to a scattering element obtained by mixing the materials having different indexes of refraction. Since the scattering element 3 scatters the light which has entered the element, an element whose inside index of refraction is nonuniform and an element whose surface has a scattering shape can be used. The element whose inside index of refraction is nonuniform can be produced by mixing two or more kinds of material or applying stress to a resin film or glass material. As the element whose surface has a scattering shape, there are a frosted diffuser and a surface fine shape element, and frosted glass, a diffraction element, a photonic crystal element, etc. can be used. Some examples of the method for producing such an element are surface polishing, nanoimprinting, and sputtering.

The light source device 1 is not limited to the configuration in which the laser light from the laser light source 2 passes through the scattering element 3. Since scattering is also caused by reflection, the laser light from the laser light source 2 may be reflected from the scattering element 3 and then made to enter the polarization conversion element 4. As the scattering element 3, an element whose surface has a scattering shape can be used.

Moreover, as the scattering element 3, a configuration in which a reflection mirror is attached to one side of an element whose inside index of refraction is nonuniform may be used.

This configuration makes it possible to reflect the light which has passed through the scattering element 3 from the reflection mirror and make the light pass through the scattering element 3 again. Therefore, the distance traveled by the light passing through the scattering element 3 is doubled, making it possible to achieve adequate scattering even with a thin element.

Figure 2:
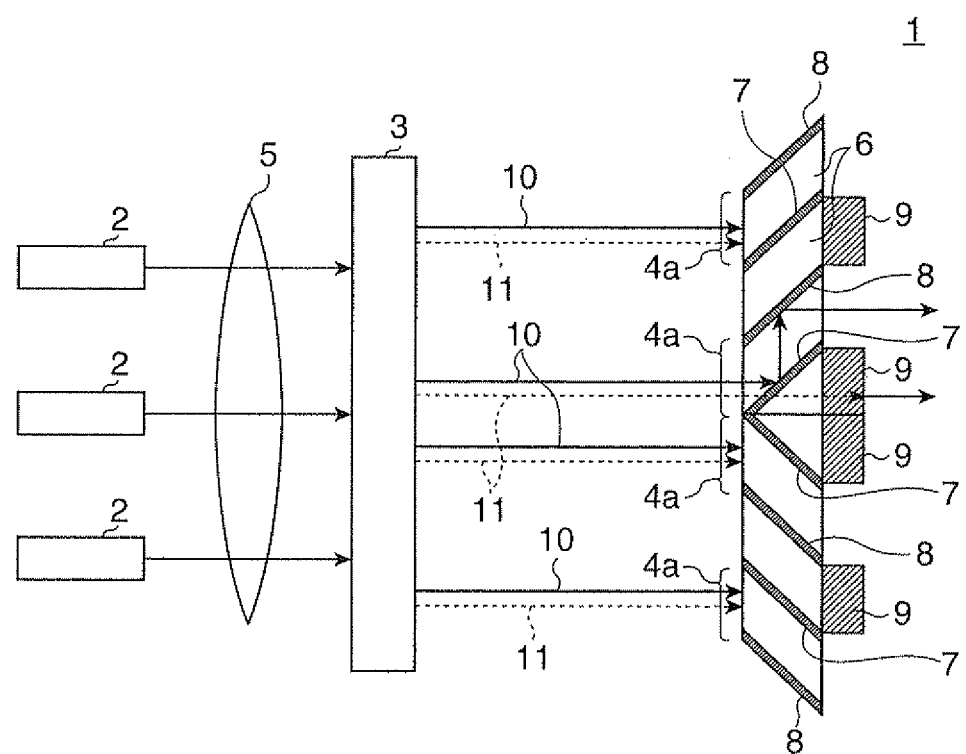
FIG. 2 is a diagram showing a schematic configuration of a light source device according to a modified example of the first embodiment.
Figure 3:
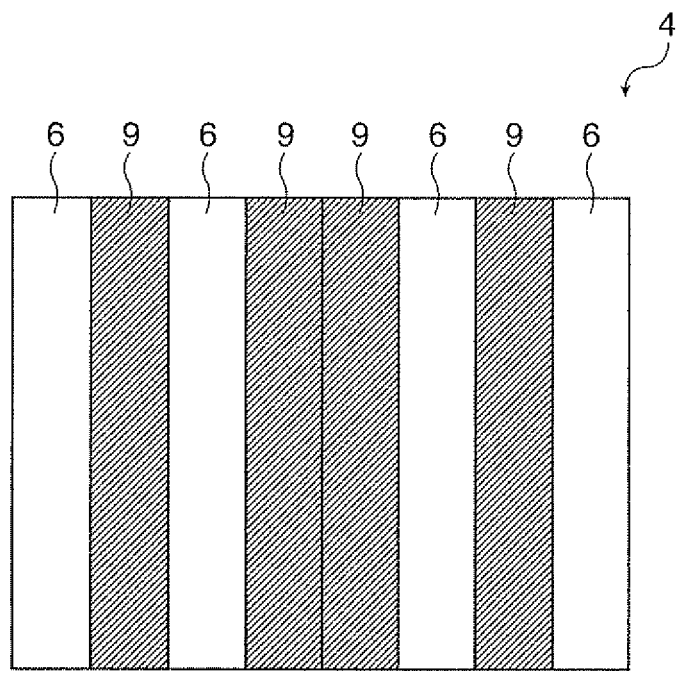
FIG. 3 is a front view of a polarization conversion element shown in FIG. 2.

FIG. 2 is a diagram showing a schematic configuration of a light source device according to a modified example of the first embodiment. FIG. 3 is a front view of a polarization conversion element 3 shown in FIG. 2. In Modified Example 1, a light source device 1 includes a plurality of laser light sources 2 arranged in array. These laser light sources 2 are arranged in such a way that the polarization directions of the laser lights emitted therefrom are aligned in the first polarization direction.

Moreover, a polarization conversion element 4 too has a plurality of bases 6 arranged in array and bonded to one another. In addition, at the bonded faces of the bases 6, a polarization separation element 7 and a reflection mirror 8 are alternately formed by evaporation. In this configuration, a plurality of light incident regions 4a are formed in the polarization conversion element 4. Furthermore, a plurality of polarization rotation elements 9 are provided such that one of the plurality of polarization rotation elements 9 is placed in a position through which a light which has passed through one of the polarization separation elements 7 exits.

In this modified example, an unillustrated integrator lens splits the lights exiting from the scattering element 3 and makes the split lights enter the incident regions 4a of the polarization conversion element 4. Then, the polarization direction of the light which has entered the polarization conversion element 4 is adjusted to coincide with the first polarization direction, and the light is made to exit.

As described above, by providing the plurality of laser light sources 2, it is possible to increase the amount of light emitted from the light source device 1. Moreover, with the polarization conversion element 4 formed of the plurality of bases 6 arranged in parallel, it is possible to increase the number of incident regions 4a and thereby cope with the spread of the luminous flux. Furthermore, since the plurality of polarization rotation elements 9 are provided, it is possible to reduce the amount of light to be converted by one polarization rotation element 9 and thereby prevent deterioration of the polarization rotation element 9 and the adhesive. This also makes it possible to provide a light source device 1 with higher reliability.

Incidentally, although an adhesive is used also at the bonded faces of the bases 6, the amount of usage of the adhesive and the thickness thereof are smaller than those of the adhesive used to bond the base 6 and the polarization rotation element 9 together, the base 6 and the polarization rotation element 9 having different coefficients of thermal expansion, and therefore an influence of deterioration is relatively small.

Figure 4:
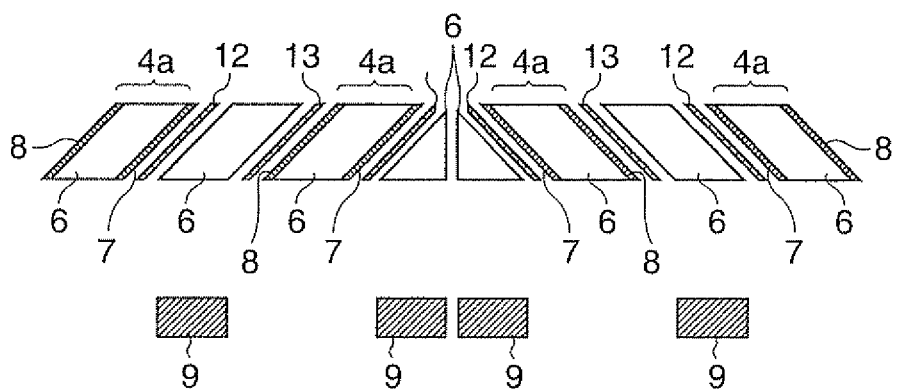
FIG. 4 is an exploded view of the polarization conversion element shown in FIG. 2.

FIG. 4 is an exploded view of the polarization conversion element 4. As shown in FIG. 4, by evaporating the polarization separation element 7 or the reflection mirror 8 onto a base 6 of the bases 6 arranged in parallel, the base 6 having the incident region 4a on one face thereof, only the light containing polarization component aligned in the second polarization direction is shone onto an adhesive 12 on the side of the polarization separation element 7, and almost no light is shone onto an adhesive 13 on the side of the reflection mirror 8. This also makes it possible to prevent deterioration of the adhesives 12 and 13 by which the bases 6 are bonded together. Moreover, by reducing the polarization component aligned in the second polarization direction, it is possible to prevent deterioration of the adhesive 12 more effectively.

Second Embodiment

Figure 5:
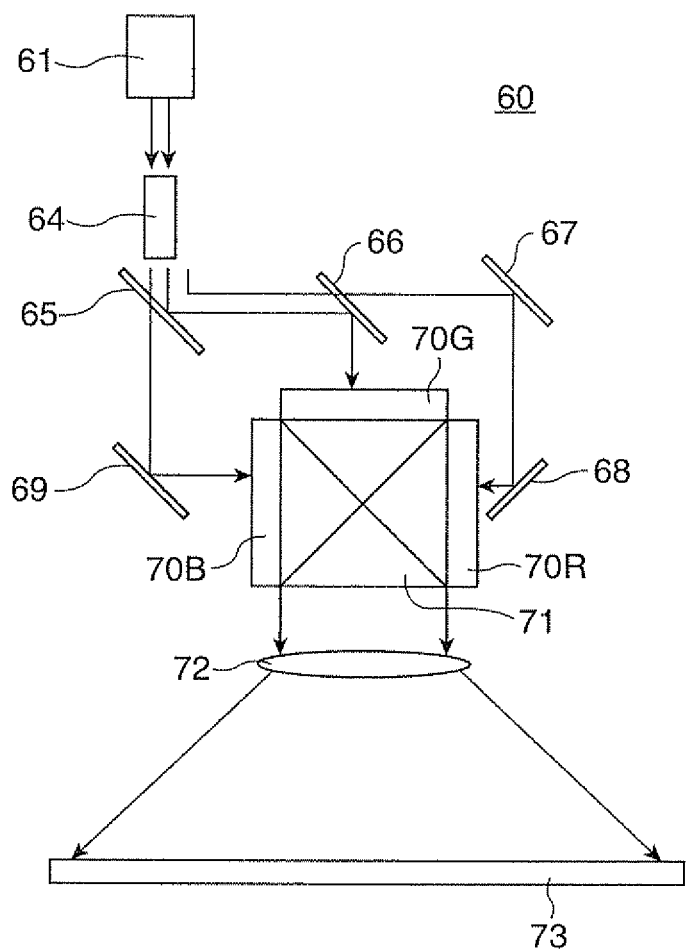
FIG. 5 is a diagram showing a schematic configuration of a projector according to a second embodiment of the invention.

FIG. 5 is a schematic configuration diagram of a projector 60 according to a second embodiment of the invention. The projector 60 according to this embodiment has a light source device 61 configured in the same manner as the light source device 1 according to the first embodiment. The light source device 61 emits a light containing a red (R) light, a green (G) light, and a blue (B) light. For example, by using a blue laser as the laser light source 2 and a resin layer containing phosphor which emits light in bands of red and green as the scattering element 3, it is possible to reproduce the three primary colors of light with a minimum configuration.

A homogenization system 64 is an optical system which homogenizes the intensity distribution of the light which has entered the system from the light source device 61, and has a rod integrator, for example. A dichroic mirror 65 allows the B light of the light from the homogenization system 64 to pass therethrough and reflects the R light and the G light. A dichroic mirror 66 allows the R light to pass therethrough and reflects the G light. The dichroic mirrors 65 and 66 function as a color separation system which separates the light from the light source device 61 into three lights according to color.

The R light which has passed through the dichroic mirror 66 is reflected from reflection mirrors 67 and 68, and then enters a spatial light modulator 70R for R light. The spatial light modulator 70R modulates the R light according to an image signal. The G light reflected from the dichroic mirror 66 enters a spatial light modulator 70G for G light. The spatial light modulator 70O modulates the G light according to the image signal. The B light which has passed through the dichroic mirror 65 is reflected from a reflection mirror 69, and then enters a spatial light modulator 70B for B light. The spatial light modulators 70R, 70G, and 70B are, for example, transmissive liquid crystal display devices.

A cross dichroic prism 71 which is a color combining system combines the colored lights which have been modulated by the spatial light modulators 70R, 70O, and 70B. A projection system 72 projects the colored lights combined by the cross dichroic prism 71 onto a screen 73. By using the light source device 61, the projector 60 can prevent deterioration of the polarization rotation element, and thereby increase the reliability and obtain a high-quality image.

Moreover, although the rod integrator is used as the homogenization system 64, a multilens array may be used instead. Furthermore, the homogenization system 64 may be omitted, or the homogenization system 64 may be incorporated into the light source device 61.

The projector is not limited to the configuration shown in FIG. 5, the configuration in which three transmissive spatial light modulators are used for three colors. The number of colors may be two or less or four or more. There is no need to make the number of spatial light modulators equal to the number of colors. For example, light of two or more colors may be made to enter one spatial light modulator having tiny color filters of a plurality of colors. Moreover, both a transmissive spatial light modulator and a reflective spatial light modulator can be used as the spatial light modulator. In some configurations, the color separation system or the color combining system can be omitted.

As described above, the light source device and the projector according to the invention are useful when an image is displayed by using a laser light.

The entire disclosure of Japanese Patent Application No. 2010-138001, filed on Jun. 17, 2010 is expressly incorporated by reference herein.

What is claimed is:

1. A light source device, comprising:
a light source emitting a coherent light having a polarization component aligned in a first polarization direction;
a scattering element converting a portion of the coherent light aligned in the first polarization direction into a polarization component aligned in a second polarization direction;
a polarization separation element receiving the polarization component aligned in the first polarization direction and the polarization component aligned in the second polarization direction and separating the polarization component aligned in the second polarization direction which is nearly perpendicular to the first polarization direction from the polarization component aligned in the first polarization direction; and
a polarization rotation element provided on an optical path along which the polarization component aligned in the second polarization direction passes, the polarization component aligned in the second polarization direction being separated by the polarization separation element, the polarization rotation element converting the polarization component aligned in the second polarization direction into a polarization component aligned in the first polarization direction;
the polarization component aligned in the second polarization direction between the scattering element and the polarization separating element being smaller than the polarization component aligned in the first polarization direction between the scattering element and the polarization separating element.

2. The light source device according to claim 1, wherein the scattering element is a fluorescent layer.

3. The light source device according to claim 1, wherein the polarization rotation element is formed of organic material.

4. The light source device according to claim 1, wherein the polarization rotation element is formed of inorganic material.

5. A projector, comprising:
the light source device according to claim 1; and
a spatial light modulator modulating a light according to an image signal, the light being emitted from the light source device.

6. A projector, comprising:
the light source device according to claim 2; and
a spatial light modulator modulating a light according to an image signal, the light being emitted from the light source device.

7. A projector, comprising:
the light source device according to claim 3; and
a spatial light modulator modulating a light according to an image signal, the light being emitted from the light source device.

8. A projector, comprising:
the light source device according to claim 4; and
a spatial light modulator modulating a light according to an image signal, the light being emitted from the light source device.

9. The light source device according to claim 1, further comprising a reflection element that reflects the polarization component aligned in the second polarization direction so that the polarization component aligned in the second polarization direction travels parallel to the polarization component aligned in the first polarization direction.

* * * * *